UNITED STATES PATENT OFFICE.

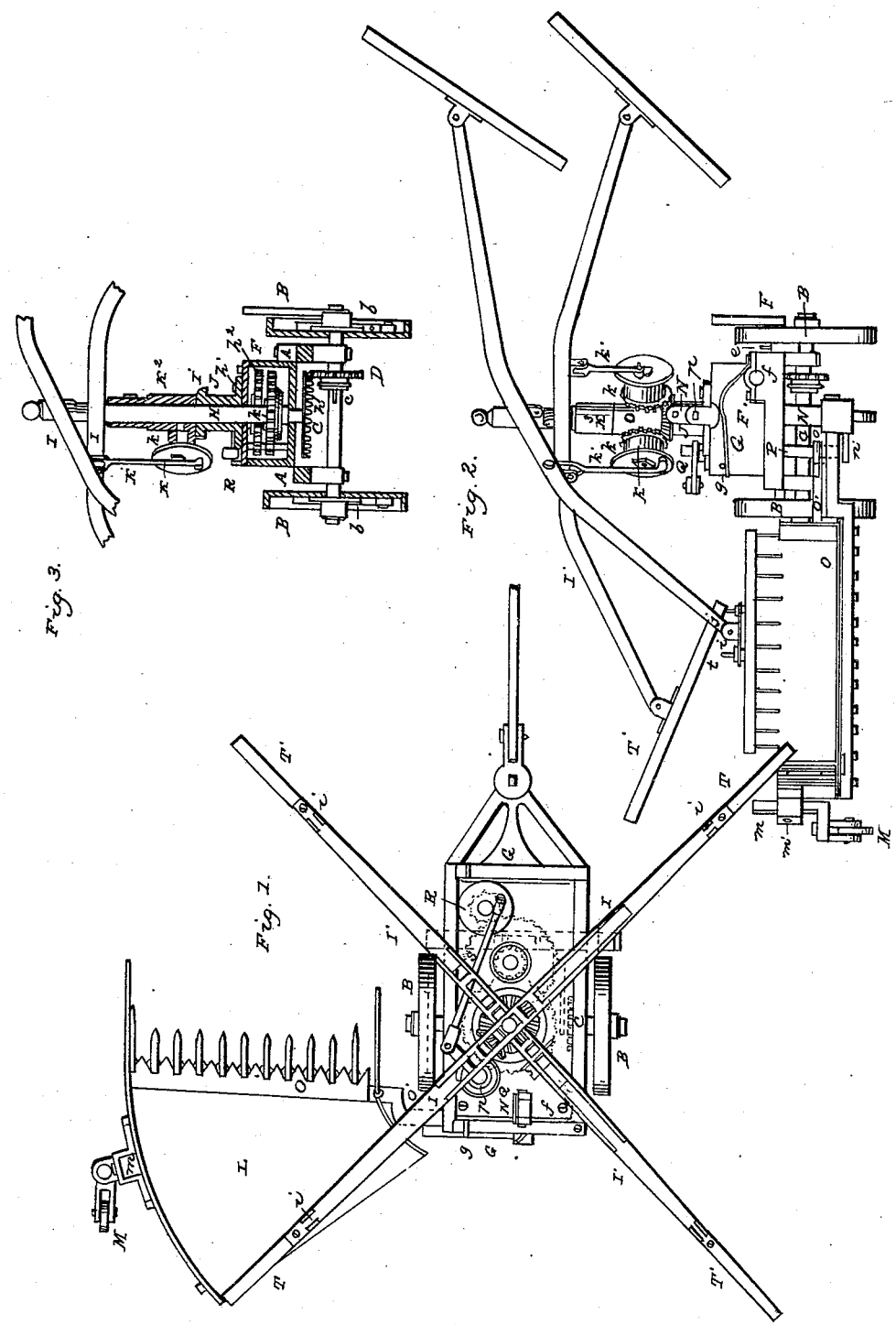

JOHN JANN, OF NEW WINDSOR, MARYLAND.

HARVESTING-MACHINE.

Specification forming part of Letters Patent No. 39,403, dated August 4, 1863.

*To all whom it may concern:*

Be it known that I, JOHN JANN, of New Windsor, in the county of Carroll and State of Maryland, have invented certain new and useful Improvements in Harvesting-Machines; and I do hereby declare the following to be a full and exact description of the same, reference being had to the accompanying drawings, making part of this specification, in which—

Figure 1 is a plan of a harvesting-machine illustrating my invention. Fig. 2 is a rear view of the same. Fig. 3 is a vertical section at $x\ x$, Fig. 1.

Similar letters of reference indicate corresponding parts in the several views.

My invention consists, first, in a peculiar device for operating oblique revolving rake-arms; second, in a peculiar combination and arrangement of gearing, by which motion is communicated to the working parts, as hereinafter explained; third, in a device for supporting the weight of the gear-frame upon the main frame.

To enable others skilled in the art to which my invention appertains to fully understand and use the same, I will proceed to describe its construction and operation.

A is the main frame of the machine, supported on two driving-wheels, B B, which are fitted to turn loosely on the axle C, so as to present no impediment to backing or turning, but provided with ratchet-connections $b\ b$, by which motion is imparted to the axle when the machine is drawn forward. The axle $b$ carries a pinion, D, working upon a feather, so as that it shall receive rotation from the shaft, but have free play longitudinally thereon, which longitudinal play may be imparted by a sliding bar, E, or by a lever or other equivalent means. $e$ is a pin passing through a hole in the bar E to hold it in either its inner or outer position.

F represents a gear-frame, pivoted at one edge, at $f\ f$, to the main frame A, and supported at its other edge by pins $g$, resting upon springs G.

H is a vertical shaft journaled in the gear-frame G. The said shaft carries a gear-wheel, $h'$, and is driven by a bevel or crown gear wheel $h$ at its lower end, which meshes with the clutch-pinion D exactly in the line of the pivots $f$, so that any motion of the gear-frame upon the said pivots will not affect the working of the wheels.

I I' are rake or reel arms, pivoted to the upper end of the shaft H in such manner that they are carried around by the rotation of the shaft, but have free vibration thereon in vertical planes.

J is a hollow post, secured rigidly to the gear-frame F around the vertical shaft H, and formed or provided with a bevel-cogged ring, $j$.

K K' are crank-wheels journaled upon a sleeve, $I^2$, which is so attached to the shaft H as to be carried by it in its rotation. The crank-wheels K K' are formed with beveled cog-rims $k$, gearing with the cog-ring $j$, and are connected with the rake and reel arms I I' by pitmen $k'$, by which means the alternate ends of the said arms are elevated and depressed at the proper periods of their rotation to bring the reels and rake in contact with the standing grain and afterward with the cut grain upon the platform, then withdraw them from the discharged gavel and elevate them over the frame of the machine. By having the arms constructed in pairs, extending on both sides of the frame, and rigidly connected together, so that one end shall be elevated by the depression of the other, and vice versa, a single crank and pitman may be made to serve for each pair of arms, as shown in the present illustration.

The grain-platform L is supported at its outer end by a caster-wheel, M, pivoted upon the lower end of a shank, $m$, adapted to slide up and down in a socket on the platform, and secured in any necessary position by a pin, $m'$, so as to support the end of the platform at any desired height.

The inner end of the platform or finger-bar O is suspended rigidly from the gear-frame F by a square suspension-standard, N, sliding vertically within a socket in the gear-frame and held at any height by a pin, $n$. By these means the inner end of the platform may be supported at any desired height from the ground; but the platform and gear-frame being always held rigidly together in a position parallel with each other, the cutting and raking mechanism bear the same relation to the platform in all positions of the latter, so that the platform may assume any angle to conform to the surface of the ground, and the gear-frame and rake being moved with it will always operate with equal freedom.

The cutter-bar O' receives a reciprocating motion from a crank-arm, o, projecting from a vertical shaft, P, which rests in a step, n', projecting from the lower end of the rigid standard N.

Q is a crank-sleeve journaled in the upper side of the gear-frame F. The shaft P is adapted to slide vertically within the sleeve Q as the suspension-standard N is set up or down, but being formed with a feather, p, Fig. 1, fitting a corresponding groove in the sleeve, will receive rotation therefrom at whatever height it may be fixed.

R is a crank-wheel mounted on the upper end of a vertical shaft, r, at the forward end of the gear-frame. The wrist r' of the crank-wheel R is connected with the crank-arm q of the sleeve Q by a pitman, S; but the radius of the crank q being much greater than that of the crank-wheel R, a continuous rotation of the latter will impart a reciprocating rotary motion to the former. Continuous rotary motion communicated from the wheel $h'$ to the shaft r through intermediate gearing, $h^2$, (shown by dotted lines in Fig. 1,) thus imparts a reciprocating motion to the cutter-bar.

The rake and reel heads T T' are connected to their arms by pivots i, as shown in Figs. 1 and 2, so that they may be made to assume any angle in relation to the arms. The rake-head T has also a vertical adjustment by means of screws t and double set-nuts t', so that it may be set to work as near the platform as desired.

When the machine is to be used for mowing grass the reel and rake arms and sleeve $K^2$, with their attachments, may be removed bodily and the platform may be taken from the bar O in customary manner.

Having thus described my invention, what I claim as new therein, and desire to secure by Letters Patent, is—

1. Operating horizontally-revolving reel or rake arms by crank and pitman, substantially as described.

2. The combination of the crown or bevel cog-wheel h, gearing with the clutch-pinion D in line with the pivots $f\,f$, the reel and rake shaft H, and the multiplying-gearing $h'\,h^2$ and shaft r, mounted within the gear-frame F and employed to transmit motion to the cutters, when the said parts are constructed, arranged, and operate in the manner and for the purposes specified.

3. The combination of the supporting-springs G, with the pivoted gear-frame F, arranged and operating substantially as and for the purposes set forth.

JOHN JANN.

Witnesses:
THOMAS TIPTON,
SIMON BANGE.